3,206,463
PYRIDOXINE ASPARTATE AND ITS PROCESS OF PREPARATION

Jacques Louis Edouard Baetz, La Garenne-Colombes, France, assignor to l'Equilibre Biologique, Loiret, France, a French body corporate
No Drawing. Filed Nov. 30, 1962, Ser. No. 242,044
Claims priority, application France, Dec. 4, 1961, 880,886; Feb. 28, 1962, 889,530
1 Claim. (Cl. 260—295)

The invention relates to pyridoxine aspartate, its process of preparation and therapeutic compositions containing pyridoxine aspartate.

The pyridoxine aspartate is a new compound chemically defined by the empirical formula $C_{12}H_{17}O_7N_2$ and the structural formula:

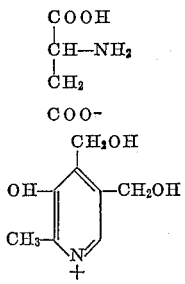

It has therefore a molecular weight of 301.27 and its total nitrogen content is 9.29%.

It is in the form of a whitish cream micro-crystalline powder which is soluble in water, slightly soluble in alcohol, acetone, ether and benzene. The not very clear melting point starts between 140 and 145° C. A 10% aqueous solution has a pH of 4.6–5.

Pyridoxine aspartate is of utility in therapeutics as a refresher and a cardiotonic as will be clear from the following description.

The process of preparing pyridoxine aspartate according to the invention comprises neutralizing the pyridoxine base by the substantially equimolecular amount of aspartic acid. The reaction is carried out in a solvent medium such as water from which the required salt can be extracted either by crystallization after concentration of by precipitation by means of a suitable solvent.

The following example illustrates the invention:

EXAMPLE 22.7 g. of pyridoxine base are dissolved in 100 ml. of distilled water on a boiling water bath, then 17.41 g. of d,l-aspartic acid are added and the mixture is stirred until dissolution. The solution thus obtained is evaporated until dryness on the water bath and the drying is completed under a vacuum on phosphorus pentoxide.

The pyridoxine aspartate thus obtained can be characterised chemically, in addition to the content of nitrogen according to Kjeldahl, by the following identity reactions:

(1) *Identity reaction of aspartic acid using ninhydrin*

(a) REAGENTS (1) 0.1% ninhydrin solution in a citrate buffer solution.

(2) Citrate buffer, pH=5:

Citric acid _____g__ 21.01
Normal solution of sodium hydroxide _____ml__ 200
Distilled water to make 1,000 ml.

(b) METHOD 5 ml. of 10% solution of pyridoxine aspartate are added to 5 ml. of 0.1% ninhydrin buffered solution and heated for 5 minutes on a boiling water bath; a violet-purple colour appears which is characteristic of aspartic acid.

(2) *Identity reaction of pyridoxine using 2,6-dichloroquinonechlorimide*

(a) REAGENTS (1) Reagent proper: 0.04% solution of 2,6-dichloroquinonechlorimide in isopropanol.

(2) Buffer solution, pH=9.4:

Ammonium chloride _____g__ 160
Concentrated ammonia _____ml__ 160
Distilled water to make 1 litre.

(3) 5% solution of boric acid.

(b) METHOD

Place into two test tubes A and B:

|  | A | B |
|---|---|---|
| Pyridoxine aspartate _____approx__ | 200γ | 200γ |
| Distilled water _____ml__ | 5 | 5 |
| Buffer solution pH=9.4 _____ml__ | 2 | 2 |
| Boric acid solution _____ml__ | 0 | 1 |
| Ninhydrin reagent _____ml__ | 1 | 1 |

In the test tube A a blue color which rapidly changes to a dirty green appears.

In the test tube B merely a pinkish colour appears.

The pharmacological study of pyridoxine aspartate reveals the following properties.

(1) Toxicity: By the intraperitoneal route in the mouse the $LD_{50}$ of pyridoxine aspartate is around 3.2 g. per kg.

(2) In the cardio-vascular territory in the dog: By the intravenous route, this compound, as soon as the dose of 15 mg. per kg. is reached, increases the differential between the systolic pressure and the diastolic pressure.

On the isolated auricle of the rabbit, there is observed a slight increase in the amplitude for a concentration of the compound $1.10^{-6}$.

(3) Action on the diuresis and the renal volume: In the dog by the intravenous route at the dose of 10 mg. per kg. this compound has a tendency to produce a renal vasodilatation and a slight increase in the diuresis.

(4) Action on the intestinal motivity: On the isolated duodenum of the rabbit there is observed a slight increase in the spontaneous motivity at the relatively strong concentration of $1.10^{-4}$.

(5) Action on fatigue: On an isolated phrenic nerve-diaphragm preparation of the rat, the compound delays the appearance of fatigue produced by 80 stimulations per minute.

Furthermore, this compound delays the exhaustion of the white rat in a swimming test.

This pharmacological study reveals the essentially beneficial action of pyridoxine aspartate in the field of fatigue and its cardiotonic action which can be advantageously employed in human therapeutics.

In these indications, this compound can be put into suitable form with the usual appropriate excipients:

In the form of tablets, potions, drops, syrups for administration by the oral route at a daily dose of 250–1500 mg. in the adult.

In the form of suppositories having doses of 100–750 mg. for administration by the rectal route at the rate of 2–3 suppositories daily.

In ampullae having doses of 100–1000 mg. of active principal in 3–10 ml. of distilled water or other parenterally administrable vehicle, injectible at the rate of 2–4 ampullae daily.

Although specific examples of the invention have been given it must be understood that the invention is not limited to these examples.

Having now described my invention what I claim as new and desire to secure by Letters Patent is:

Pyridoxine aspartate.

References Cited by the Examiner

UNITED STATES PATENTS

| | | | |
|---|---|---|---|
| 2,364,018 | 11/44 | Barnard | 260—297.5 |
| 2,542,869 | 2/51 | Hoffman | 260—297 |
| 2,600,700 | 6/52 | Smith | 167—55 |
| 2,683,716 | 7/54 | Winsten | 260—295 |
| 3,073,745 | 1/63 | Miskel | 167—65 |

OTHER REFERENCES

Fieser et al.: "Organic Chemistry," 3rd Ed., pp. 225–28 (Reinhold) (1956).

WALTER A. MODANCE, *Primary Examiner.*

LEWIS GOTTS, *Examiner.*